United States Patent
Fujita

(10) Patent No.: US 9,170,764 B2
(45) Date of Patent: Oct. 27, 2015

(54) IMAGE FORMING APPARATUS

(71) Applicant: KYOCERA Document Solutions Inc., Osaka (JP)

(72) Inventor: Hiroyuki Fujita, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/186,952

(22) Filed: Feb. 21, 2014

(65) Prior Publication Data

US 2014/0240752 A1 Aug. 28, 2014

(30) Foreign Application Priority Data

Feb. 26, 2013 (JP) ................................. 2013-036488

(51) Int. Cl.
G06K 15/00 (2006.01)
G06F 3/12 (2006.01)
H04N 1/00 (2006.01)

(52) U.S. Cl.
CPC .......... *G06F 3/1234* (2013.01); *H04N 1/00127* (2013.01); *H04N 1/00167* (2013.01); *H04N 1/00188* (2013.01)

(58) Field of Classification Search
None
See application file for complete search history.

(56) References Cited

U.S. PATENT DOCUMENTS

| 6,389,544 B1* | 5/2002 | Katagiri | 713/300 |
| 8,456,498 B2* | 6/2013 | Shoji et al. | 347/188 |
| 8,740,485 B2* | 6/2014 | Nakashima | 400/621 |
| 2012/0020717 A1* | 1/2012 | Nakashima | 400/621 |
| 2012/0098916 A1* | 4/2012 | Shoji et al. | 347/211 |

FOREIGN PATENT DOCUMENTS

JP 2004-148724 A 5/2004

* cited by examiner

*Primary Examiner* — Marcus T Riley
(74) *Attorney, Agent, or Firm* — Knobbe, Martens, Olson & Bear LLP

(57) ABSTRACT

An image forming apparatus includes: a motor unit configured to give a rotary drive force to rotary members for conveying a recording medium; a switch circuit provided in a power supply line connecting a power source and the motor unit to supply electric power, connecting the motor unit to the power source upon closure of the body cover, and disconnecting the motor unit from the power source upon opening of the body cover; a power-off detecting section; a rate-of-voltage-change calculating section; and a control section. The control section deactivates each of mechanisms in the image forming apparatus when the power-off detecting section detects shut-off of power supply from the power source, and reactivates each of the mechanisms, provided that the rate of change of voltage calculated by the rate-of-voltage-change calculating section has reached a predetermined threshold, when the power-off detecting section detects electric power is supplied from the power source.

7 Claims, 5 Drawing Sheets

BODY COVER CLOSED

BODY COVER OPEN

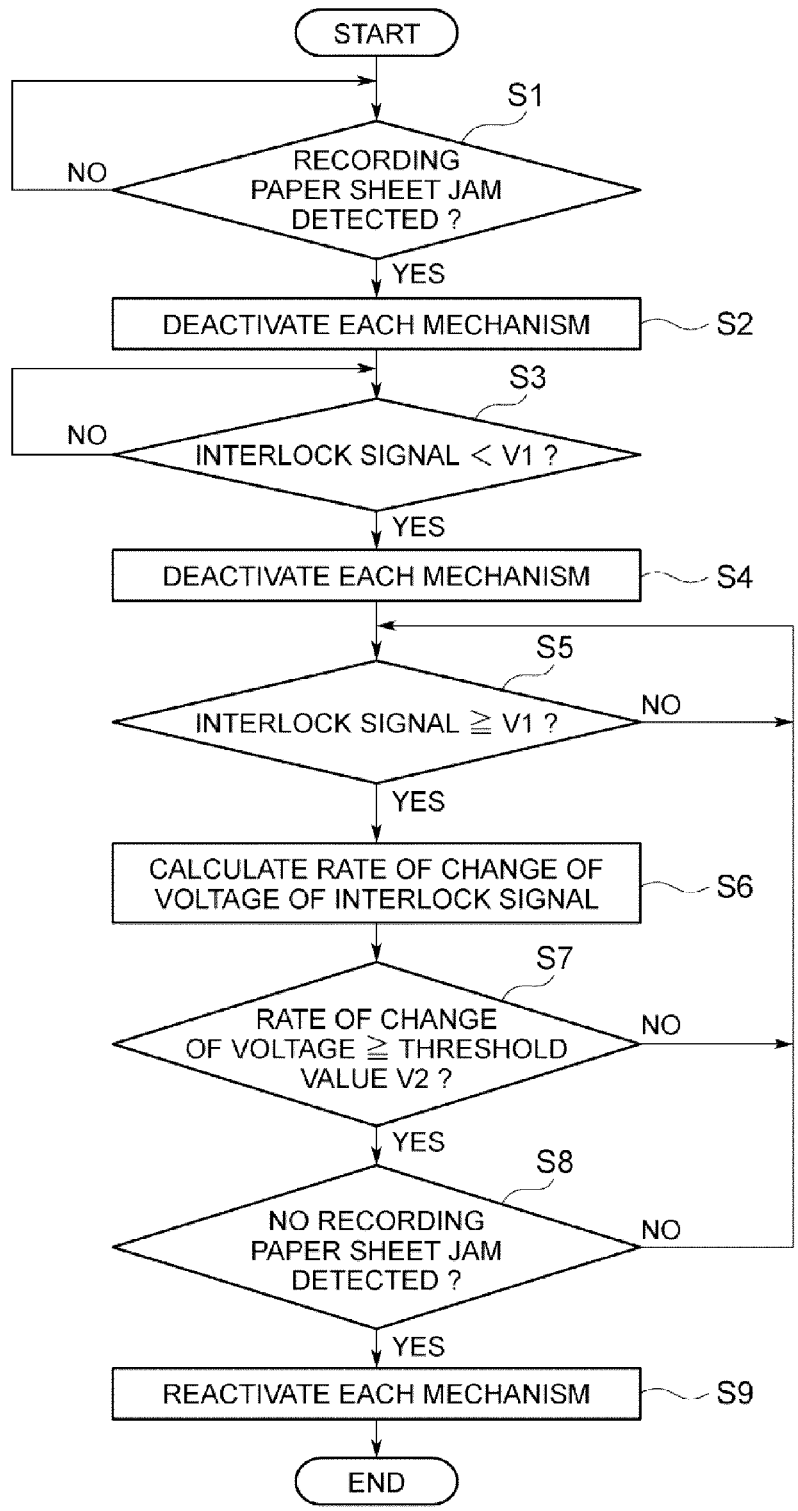

IMAGE FORMING APPARATUS

INCORPORATION BY REFERENCE

This application claims priority to Japanese Patent Application No. 2013-036488 filed on Feb. 26, 2013, the entire contents of which are incorporated by reference herein.

BACKGROUND

The present disclosure relates to image forming apparatuses and particularly relates to a technique for controlling each of mechanisms included in an image forming apparatus in response to the opening/closing of a body cover provided on the apparatus body. The image forming apparatus is configured so that a conveyance roller conveys a recording paper sheet with a drive force supplied from a motor and an image forming section forms an image on the conveyed recording paper sheet. If in this image forming apparatus a recording paper sheet is jammed in a conveyance path, i.e., a paper jam occurs, the operator opens the body cover to expose internal mechanisms and removes the recording paper sheet jammed in the conveyance path. In this case, in conjunction with the opening of the body cover, an interlock switch is turned off to shut off power supply to the motor and a power-off detecting circuit detects the power shutoff and outputs a signal indicating it to a CPU, so that the mechanisms of the image forming apparatus can be deactivated.

SUMMARY

A technique further modified from the above known technique is proposed as an aspect of the present disclosure.

An image forming apparatus according to one aspect of the present disclosure includes a motor unit, an interlock switch circuit, a power-off detecting section, a rate-of-voltage-change calculating section, and a control section.

The motor unit is configured to give a rotary drive force to each of rotary members for use in conveying a recording medium.

The interlock switch circuit is provided in a power supply line capable of connecting a power source and the motor unit to supply electric power, connects the motor unit to the power source upon closure of the body cover, and disconnects the motor unit from the power source upon opening of the body cover.

The power-off detecting section is configured to, based on a voltage of the power supply line, detect whether or not power supply from the power source is shut off.

The rate-of-voltage-change calculating section is configured to calculate a rate of change of voltage of the power supply line.

The control section is configured to deactivate each of mechanisms included in the image forming apparatus when the power-off detecting section detects shutoff of the power supply and reactivate each of the mechanisms, on condition that the rate of change of voltage calculated by the rate-of-voltage-change calculating section has reached a predetermined threshold value, when the power-off detecting section detects the voltage from the power supply line.

BRIEF DESCRIPTION OF THE DRAWINGS

FIG. 5 is a flowchart showing a processing flow during control over the operation of the image forming apparatus according to the one embodiment of the present disclosure depending upon the voltage of the power supply line.

DETAILED DESCRIPTION

Figure 1:
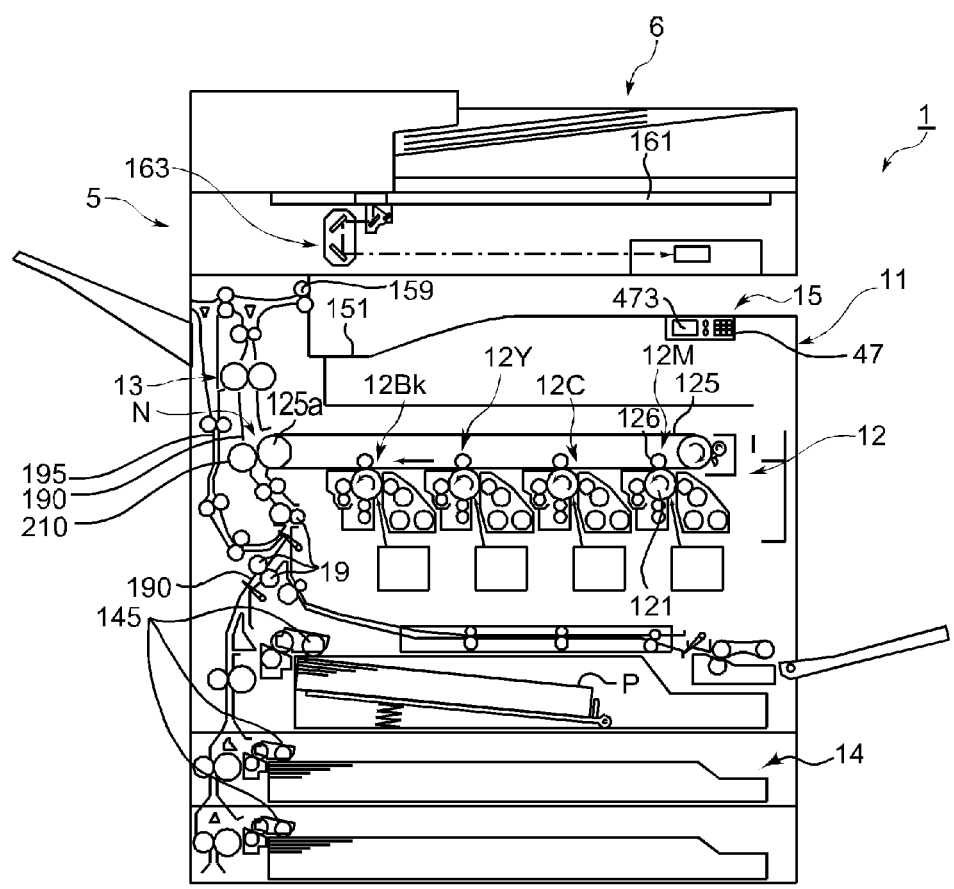
FIG. 1 is a front cross-sectional view showing the structure of an image forming apparatus according to one embodiment of the present disclosure.

Hereinafter, a description will be given of an image forming apparatus according to one embodiment of the present disclosure with reference to the drawings. FIG. 1 is a front cross-sectional view showing the structure of the image forming apparatus according to the one embodiment of the present disclosure.

The image forming apparatus 1 according to the one embodiment of the present disclosure is a multifunction peripheral having multiple functions including, for example, a copy function, a print function, a scan function, and a facsimile function. The image forming apparatus 1 is made up so that an apparatus body 11 thereof includes an operating section 47, an image forming section 12, a fixing section 13, a paper feed section 14, a document feed section 6, a document reading section 5, and so on.

The operating section 47 is configured to receive operator's commands for various types of operations and processing executable by the image forming apparatus 1, such as a command to execute an image forming operation and a command to execute a document reading operation. The operating section 47 includes a display 473 configured to display operation guidance to the operator, an image informing the operator of the occurrence of a paper jam, and so on.

In a document reading operation of the image forming apparatus 1, the document reading section 5 optically reads an image of an original document being fed from the document feed section 6 or an image of an original document placed on an original glass plate 161 to generate image data. The image data generated by the document reading section 5 is stored on an internal HDD, a network-connected computer or the like.

In an image forming operation of the image forming apparatus 1, the image forming section 12 forms a toner image on a recording paper sheet P serving as a recording medium fed from the paper feed section 14, based on image data generated by the document reading operation, image data received from a network-connected computer or image data stored on the internal HDD. In the case of color printing, an image forming unit 12M for magenta, an image forming unit 12C for cyan, an image forming unit 12Y for yellow, and an image forming unit 12Bk for black of the image forming section 12 form respective toner images on their respective photosensitive drums 121 through charging, exposure, and developing processes based on respective images of respective different color components constituting the above image data and then allow their respective primary transfer rollers 126 to transfer the toner images to an intermediate transfer belt 125.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and a drive roller 125a with the intermediate transfer belt 125 in between, to a recording paper sheet P conveyed from the paper feed section 14 along a conveyance path 190. Thereafter, the fixing section 13 fixes the toner image on the recording paper sheet P by the application of heat and pressure. The recording paper sheet P on which a multicolor image has been fixed by the completion of the fixing treatment is discharged to a paper output tray 151.

The paper feed section 14 includes a plurality of paper feed cassettes. A control section 100 (see FIG. 2) rotationally drives a pick-up roller 145 (an example of the rotary member) of the paper feed cassette containing recording paper sheets of the size designated by an operator's command and thereby allows the pick-up roller 145 to feed a recording paper sheet P contained in the paper feed cassette toward the nip N.

In the case of double-sided printing of the image forming apparatus 1, the recording paper sheet P having an image already printed on one side by the image forming section 12 is nipped by an output roller pair 159, then moved back and conveyed to a reverse conveyance path 195 by the output roller pair 159, and conveyed again upstream of the nip N and the fixing section 13 in a direction of conveyance of the recording paper sheet P by a conveyance roller pair 19. Thus, an image is formed on the other side of the recording paper sheet P by the image forming section 12.

A body cover (not shown) capable of being opened and closed is disposed at the front and/or side surface of the image forming apparatus 1. The opening/closing of the body cover interlocks with the on/off action of a switch circuit 51 configured to switch between supply and non-supply of electric power from a power source 60 to a motor unit 70, both of which will be described later. When electric power is supplied from the power source 60 to the motor unit 70 through the switch circuit 51 turned on upon closure of the body cover, the control section 100 allows each of mechanisms of the image forming apparatus 1 to normally operate.

In clearing a paper jam having occurred inside the image forming apparatus 1 or replacing the toner, the operator opens the body cover to expose the site of a recording paper sheet jam. When at this time the power supply from the power source 60 to the motor unit 70 is stopped by the switch circuit 51 turned off upon opening of the body cover, the control section 100 deactivates each of the mechanisms of the image forming apparatus 1. In other words, while the body cover is open, an interlock function acts on the image forming apparatus 1.

Figure 2:
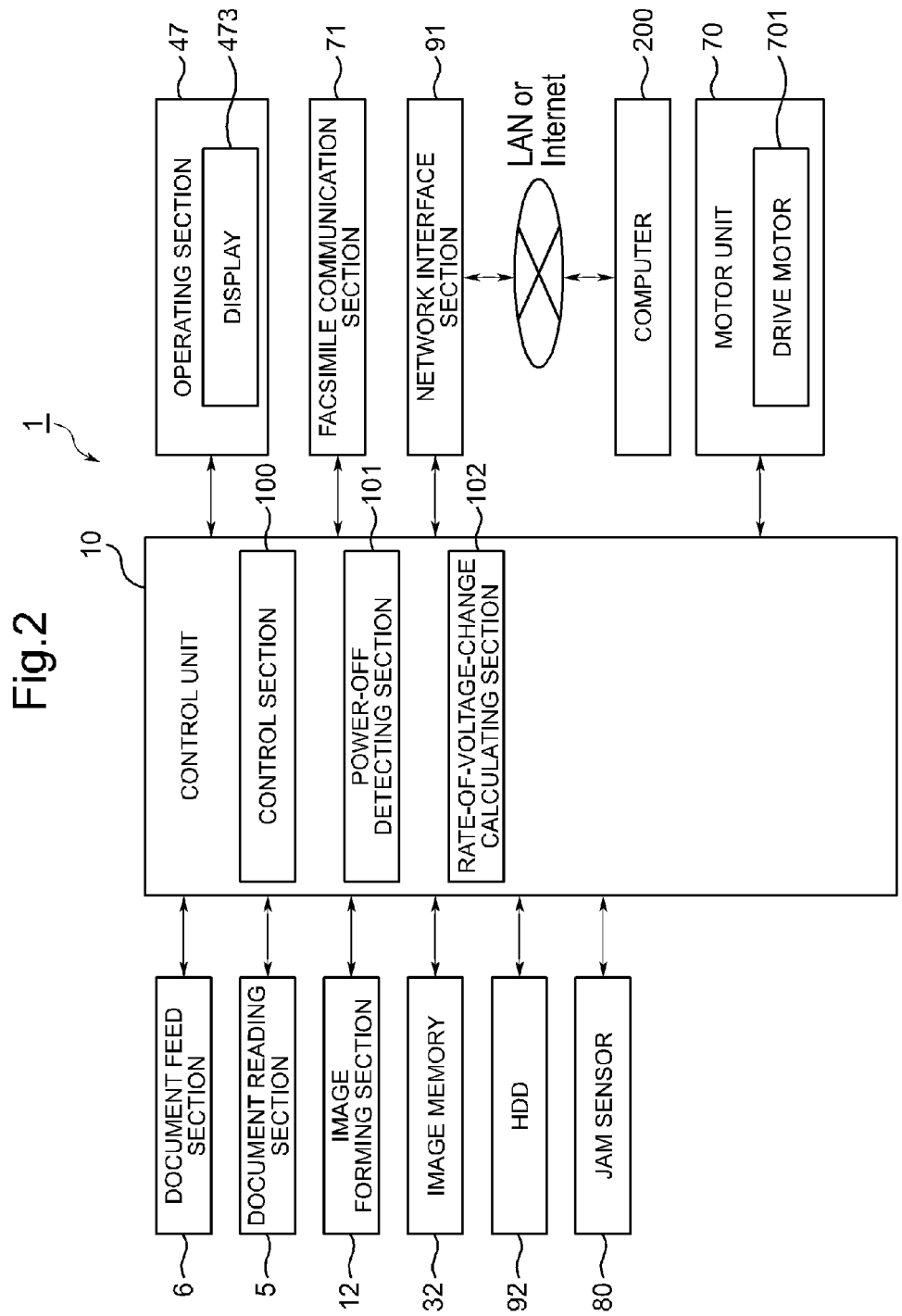
FIG. 2 is a functional block diagram showing an essential internal architecture of the image forming apparatus according to the one embodiment of the present disclosure.
Figure 3A:
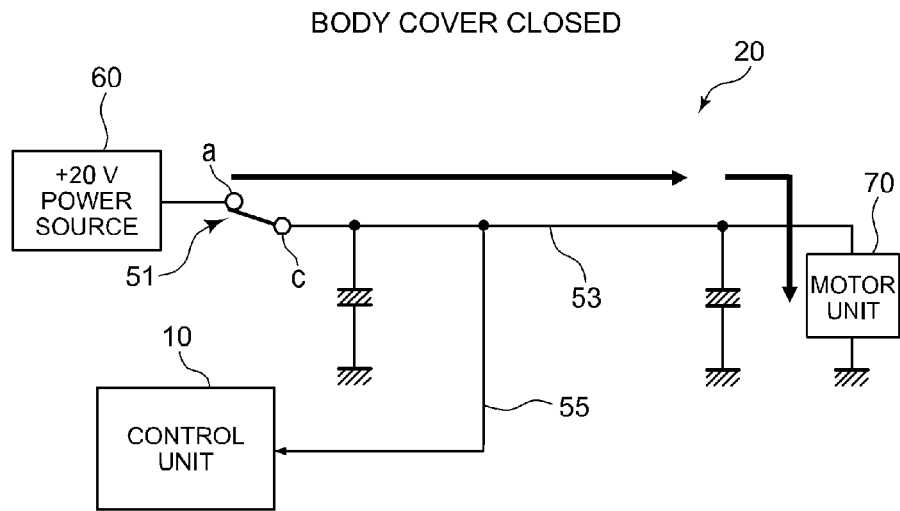
FIG. 3A is a diagram showing the structure of an interlock mechanism when a body cover of the image forming apparatus according to the one embodiment of the present disclosure is closed.
Figure 3B:
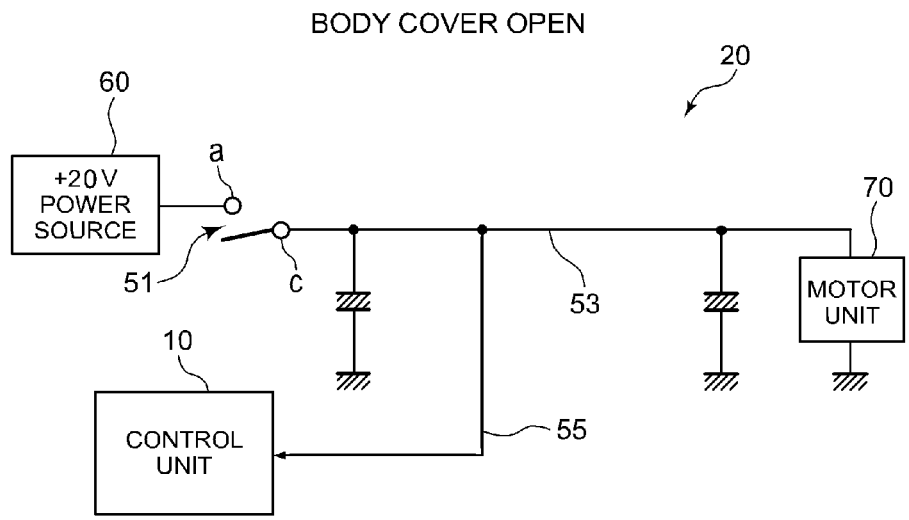
FIG. 3B is a diagram showing the structure of the interlock mechanism when the body cover of the image forming apparatus is open.

Next, a description will be given of an essential internal architecture of the image forming apparatus 1. FIG. 2 is a functional block diagram showing an essential internal architecture of the image forming apparatus 1. FIG. 3A is a diagram showing the structure of an interlock mechanism 20 when the body cover of the image forming apparatus 1 is closed; and FIG. 3B is a diagram showing the structure of the interlock mechanism 20 when the body cover of the image forming apparatus 1 is open.

The image forming apparatus 1 includes a control unit 10, the operating section 47, the document feed section 6, the document reading section 5, an image memory 32, the image forming section 12, the motor unit 70, a facsimile communication section 71, a network interface section 91, a jam sensor 80, and an HDD 92.

The document reading section 5 includes a reader 163 (see FIG. 1) including a lighting part, a CCD sensor, and so on. The document reading section 5 is configured to read an image from an original document by irradiating the document with light from the lighting part and receiving the reflected light on the CCD sensor under the control of the control unit 10.

The image memory 32 provides a region for temporarily storing data of image of the original document read by the document reading section 5 and temporarily storing data to be printed by the image forming section 12.

The facsimile communication section 71 includes a coding/decoding section, a modulation/demodulation section, and an NCU (network control unit), all of which are not illustrated, and performs facsimile communication using a public telephone network.

The network interface section 91 is constituted by a communication module, such as a LAN board, and transfers various data to and from computers 200 and the like in a local area or on the Internet via a LAN or the like connected to the network interface section 91.

The HDD 92 is a large storage device capable of storing document images and the like read by the document reading section 5.

The motor unit 70 includes a drive motor 701 and a drive circuit (driver) configured to drive the drive motor 701. The drive motor 701 is a drive source for applying a rotary drive force to various rotary members, including the conveyance roller pair 19 and other rotary members of the image forming section 12 and so on. The rotary drive force of the drive motor 701 is transmitted through an unshown gear to the various rotary members. In this embodiment, a mechanism using a one-way clutch or a clutch-free mechanism is employed as a mechanism for transmitting a drive force from the drive motor 701 to each rotary member.

The jam sensor 80 is a sensor configured to detect a recording paper sheet jam in the path, such as the conveyance path 190, along which the recording paper sheet P is to be conveyed, and output a detection signal indicating the presence or absence of a jam to the control unit 10. The jam sensor 80 is an optical sensor including a light-emitting part and a light-receiving part disposed in the path with the recording paper sheet P between them or a mechanical switch provided in the path and configured to get turned on upon contact with the recording paper sheet P. The jam sensor 80 is provided at an appropriate point in the conveyance path 190 along which the recording paper sheet P is to be conveyed.

The control unit 10 is composed of a CPU, a RAM, a ROM, a dedicated hardware circuit, and so on and governs the overall operation control of the image forming apparatus 1. The control unit 10 includes the control section 100, a power-off detecting section 101, and a rate-of-voltage-change calculating section 102.

The control section 100 is connected to the operating section 47, the document feed section 6, the document reading section 5, the image memory 32, the image forming section 12, the motor unit 70, the facsimile communication section 71, the network interface section 91, the HDD 92, and so on and controls the operations of these components.

Furthermore, upon receipt of a jam detection signal output from the jam sensor 80, the control section 100 performs processing, such as deactivating the drive motor 701 to stop the conveyance of the recording paper sheet P.

The power-off detecting section 101 is configured to detect whether or not power supply from the power source 60 (see FIGS. 3A and 3B) from the motor unit 70 is shut off. For example, the power-off detecting section 101, based on a voltage generated in a power supply line 53 provided between the switch circuit 51 and the motor unit 70 for connecting the power source 60 and the motor unit 70, detects whether or not the power supply is shut off. The control section 100, based on the detection result of the power-off detecting section 101, controls each mechanism of the image forming apparatus 1 to activate or deactivate it.

The rate-of-voltage-change calculating section 102 is configured to calculate a rate of change of voltage of the power supply line 53. For example, upon change of the voltage of the power supply line 53, the rate-of-voltage-change calculating section 102 calculates the rate of change of voltage based on the rising characteristic of the voltage.

When the power-off detecting section 101 detects shutoff of the power supply from the power source 60, the control section 100 considers the body cover to be open and deactivates each of the mechanisms included in the image forming apparatus 1. On the other hand, when the power-off detecting section 101 detects the voltage from the power supply line 53 by electric power supplied from the power source 60 and the like, the control section 100 considers the body cover to be closed and reactivates each of the mechanisms of the image forming apparatus 1 on condition that the rate of change of voltage calculated by the rate-of-voltage-change calculating section 102 has reached a predetermined threshold value (to be described later).

The image forming apparatus 1 includes the interlock mechanism 20 shown in FIGS. 3A and 3B. The interlock mechanism 20 is configured to switch between supply and non-supply of electric power to the motor unit 70. The interlock mechanism 20 includes the switch circuit 51 and the motor unit 70.

As described previously, the switch circuit 51 is an interlock switch circuit interlocking with the opening/closing of the body cover of the image forming apparatus 1. When the body cover is closed, the switch circuit 51 makes contact between its contact point a and its contact point c to connect the power source 60 to the power supply line 53 (see FIG. 3A). When the operator opens the body cover of the image forming apparatus 1, the switch circuit 51 breaks the contact between the contact point a and the contact point c (see FIG. 3B).

The power source 60 is a source of electric power for the motor unit 70 and a +20 V power source in this embodiment.

Furthermore, the power supply line 53 provided between the switch circuit 51 and the motor unit 70 for connecting the power source 60 and the motor unit 70 is connected to a connecting line 55 for use in inputting a voltage of the power supply line 53 to the control unit 10. Although not specifically shown, the connecting line 55 is provided with a voltage-dividing circuit in which a voltage of +20V of the power source 60 is converted to a voltage level applicable to a port of the control unit 10 formed such as of a CPU. A voltage converted by the voltage-dividing circuit is input to the port of the control unit 10.

Figure 4B:
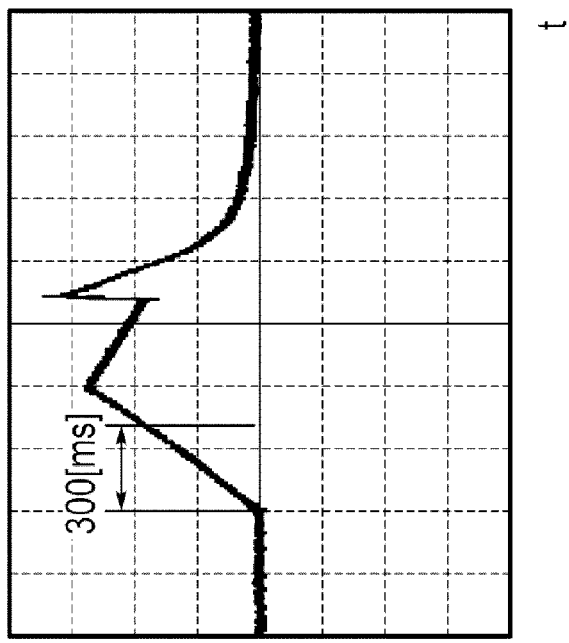
FIG. 4B is a graph showing the voltage of the power supply line when an electromotive force is generated.
Figure 4A:
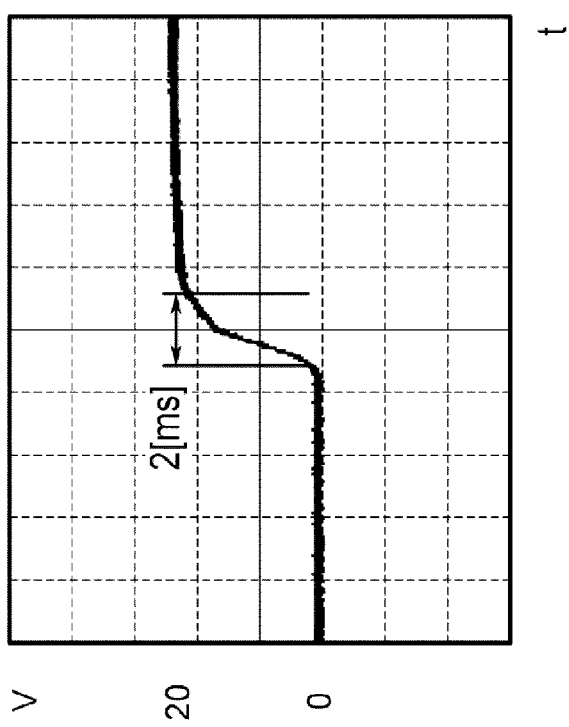
FIG. 4A is a graph showing the voltage of a power supply line when a switch circuit is closed.

Subsequently, with reference not only to FIG. 3 but also to FIGS. 4A and 4B and FIG. 5, a description will be given of the control over the operation of the image forming apparatus 1 depending upon the voltage of the power supply line 53. FIG. 4A is a graph showing the voltage of the power supply line 53 when the switch circuit 51 is changed from an open position to a closed position; and FIG. 4B is a graph showing the voltage of the power supply line 53 when an electromotive force is generated. FIG. 5 is a flowchart showing a processing flow during control over the operation of the image forming apparatus 1 depending upon the voltage of the power supply line 53.

When the jam sensor 80 detects a recording paper sheet jam during the operation of the image forming apparatus 1, for example, during image formation (YES in S1), the control section 100 deactivates each of the mechanisms of the image forming apparatus 1, such as the image forming section 12 (S2). In this case, the control section 100 performs processing, such as deactivating the drive motor 701 to stop the conveyance of the recording paper sheet P.

Then, when the operator opens the body cover of the image forming apparatus 1 in order to clear the recording paper sheet jam, the switch circuit 51 breaks the contact between the contact point a and the contact point c (see FIG. 3B). Thus, the motor unit 70 is prevented from being supplied with electric power from the power source 60.

The power-off detecting section 101 determines whether or not the voltage of the power supply line 53 input through the connecting line 55 (hereinafter, referred to as an interlock signal) falls below a predetermined threshold value, for example, a value V1 predetermined as a voltage value corresponding to the case where electric power is supplied from the power source 60 (S3). If the power-off detecting section 101 determines that the interlock signal falls below the voltage value V1 (YES in S3), the control section 100 considers the body cover of the image forming apparatus 1 to be open and executes the control of deactivation of each mechanism of the image forming apparatus 1 again (S4). In this state, the contact between the contact points a and c of the switch circuit 51 is broken. Therefore, the interlock signal settles at a value near 0 V. Note that if the power-off detecting section 101 determines that the interlock signal does not fall below the voltage value V1 (NO in S3), the process does not proceed to S4 and later.

Thereafter, the rate-of-voltage-change calculating section 102 determines whether or not the interlock signal has reached the voltage value V1 (S5). If the rate-of-voltage-change calculating section 102 determines that the interlock signal has reached the voltage value V1 (YES in S5), it subsequently calculates the rate of change of the interlock signal (S6).

For example, the rate-of-voltage-change calculating section 102 calculates, as the rate of change, the amount of voltage change per unit time. When the voltage of the power supply line 53, i.e., the interlock signal, is changed, the rate-of-voltage-change calculating section 102 calculates the rate of change of voltage based on the rising characteristic of the voltage. As shown in FIG. 4A, in the case where the body cover is changed from an open position to a closed position so that the switch circuit 51 is closed to generate a voltage in the power supply line 53, the voltage as the interlock signal rises from 0 (V) to 20 (V). In this example, the time taken for the voltage to rise to 20 (V) is supposed to be approximately 2 (ms).

When, with the body cover open and the conveyance roller pair 19 or the image forming section 12 exposed, the operator pulls out the recording paper sheet P caught at the nip between the conveyance roller pair 19, the nip between the drive roller 125a and the secondary transfer roller 210 or between a roller pair of the fixing section 13, the rollers, such as the conveyance roller pair 19, may reversely rotate, followed by the rotation of the drive motor 701, whereby the drive motor 701 may operate as a generator to generate an electromotive force. In the case where, as in the image forming apparatus 1, a mechanism using a one-way clutch or a clutch-free mechanism is employed as a mechanism for transmitting a drive force from the drive motor to each rotary member, such as the conveyance roller pair 19, the roller pair of the fixing section 13, the drive roller 125a or the secondary transfer roller 210, the electromotive force is directed from the drive motor 701 to the power source, so that a voltage due to the electromotive force generates in the power supply line 53.

As shown in FIG. 4B, the voltage as the interlock signal is raised also by the above electromotive force from the drive motor 701. However, in the case of voltage rise caused by the electromotive force, it takes 300 (ms) for the voltage to rise from 0 (V) to 20 (V) under the same conditions as the voltage rise upon closure of the switch circuit 51 shown in FIG. 4A. Specifically, the rate of change of voltage in the case of voltage rise upon closure of the switch circuit 51 is approximately 10 (V/ms), whereas the rate of change of voltage in the case of voltage rise caused by the electromotive force is approximately 0.0667 (V/ms). There is a large difference between both the rates of change of voltage. In this manner, a clear difference in rising characteristic of the voltage as the interlock signal exists between the voltage rise upon closure of the switch circuit 51 and the voltage rise caused by the electromotive force. Therefore, the rate-of-voltage-change calculating section 102 calculates the rate of change of voltage based on the rising characteristic in both the cases to obtain rates of change of voltage reflecting the difference in rising characteristic between both the cases.

Based on the above results, the control section 100 sets 10 (V/ms) or a value at a certain distance from 10 (V/ms) as a threshold value V2 and determines whether or not the rate of change of voltage calculated by the rate-of-voltage-change calculating section 102 has reached the threshold value V2 (S7). If the control section 100 determines that the rate of change of voltage has reached the threshold value V2 (YES in S7), the control section 100 activates the mechanisms of the image forming apparatus 1 to restart them (S9), on condition that the jam sensor 80 has detected no recording paper sheet jam (YES in S8).

On the other hand, if the control section 100 determines that the rate of change of voltage is short of the threshold value V2 (NO in S7), the control section 100 considers that the voltage rise is caused by an electromotive force due to reverse rotation of the drive motor 701, the body cover has not yet been closed, and the switch circuit 51 remains open. Thus, the process returns to S5 to determine whether or not the rate of change of voltage has reached the threshold value V1 and thus detect whether or not the body cover is closed.

Also when, after YES in S7, the jam sensor 80 detects a recording paper sheet jam (NO in S8), the process returns to S5.

For example, as a general mechanism for transmitting a drive force from a motor to a conveyance roller in an image forming apparatus, a mechanism not with a bi-directional clutch but with a one-way clutch or a clutch-free mechanism may be used from the viewpoint of cost reduction. When in clearing a jam the operator pulls out a recording paper sheet jammed in a conveyance path, so that the conveyance roller pair having caught the recording paper sheet rotates, followed by the rotation of the motor, the motor may operate as a generator to generate an electromotive force. When a voltage is generated by the electromotive force having thus generated in the motor during jam clearing, the power-off detecting circuit mistakenly detects that electric power is supplied, that is, detects that the body cover has been closed, and based on the detection result the control section may malfunction, such as allow each mechanism of the image forming apparatus to restart the normal operation. Specifically, the control section may activate the drive motor reversely rotating owing to the pullout of the recording paper sheet to rotate it forward, so that failures may occur, such as breakdown of the motor driver of the drive motor due to an excessive voltage. In this embodiment, as described previously, even if a voltage generates in the power supply line 53, the control section 100 does not allow each mechanism of the image forming apparatus 1 to normally operate, i.e., allows it to remain deactivated, unless the rate of change of voltage calculated by the rate-of-voltage-change calculating section 102 has reached the threshold value V2.

Therefore, in this embodiment, it can be prevented that the control section 100 malfunctions, such as allows each mechanism of the image forming apparatus 1 to restart the normal operation despite that the body cover of the image forming apparatus 1 is not closed. Furthermore, an event does not occur where the control section 100 activates the drive motor 701 reversely rotating due to pullout of the recording paper sheet P to rotate it forward. Thus, failures do not occur, such as breakdown of the motor driver of the drive motor 701.

Hence, in this embodiment, regardless of whether or not an electromotive force has been generated by the drive motor 701, each mechanism of the image forming apparatus 1 can be deactivated in appropriate response to the opening of the body cover. Even upon generation of an electromotive force due to the drive motor 701, the image forming apparatus 1 does not malfunction, thereby ensuring a normal interlock function.

The present disclosure is not limited to the above embodiment and can be modified in various ways. For example, although the description of the above embodiment is given taking a multifunction peripheral as an example of the image forming apparatus according to the present disclosure, the example is merely illustrative and the image forming apparatus may be any other electronic apparatus, such as a printer, a copier or a facsimile machine.

The structure and processing shown in the above embodiment with reference to FIGS. 1 to 5 are merely illustrative of the present disclosure and not intended to limit the present disclosure to the above particular structure and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
a motor unit configured to give a rotational drive force to each of rotary members for use in conveying a recording medium;
an interlock switch circuit provided in a power supply line capable of connecting a power source and the motor unit to supply electric power, the interlock switch circuit connecting the motor unit to the power source upon closure of a body cover provided on an apparatus body of the image forming apparatus and disconnecting the motor unit from the power source upon opening of the body cover;
a power-off detecting section configured to, when a voltage of the power supply line falls below a predetermined voltage value [V], detect that power supply from the power source has been shut off;
a rate-of-voltage-change calculating section configured to calculate a rate of change of voltage [V/time] of the power supply line; and
a control section,
wherein when the recording medium is pulled out of the rotary member so that the rotary member reversely rotates, the motor unit acts as a generator to generate an electromotive force and the generated electromotive force changes the voltage of the power supply line, and the control section is configured to:

when the power-off detecting section detects shutoff of power supply from the power source, deactivate each of mechanisms included in the image forming apparatus; and when thereafter the voltage of the power supply line has reached the predetermined voltage value, acquire the rate of change of voltage calculated by the rate-of-voltage-change calculating section and reactivate each of the mechanisms on condition that the rate of change of voltage has reached a predetermined threshold value.

2. The image forming apparatus according to claim 1, wherein upon change of the voltage of the power supply line, the rate-of-voltage-change calculating section calculates the rate of change of voltage based on a rising characteristic of the voltage.

3. The image forming apparatus according to claim 1, wherein when determining that the voltage of the power supply line has reached a predetermined threshold value, the rate-of-voltage-change calculating section calculates the rate of change of voltage.

4. The image forming apparatus according to claim 1, wherein the rate of change of voltage of the power supply line due to the electromotive force is lower than the rate of change of voltage of the power supply line due to electric power supplied from the power source.

5. The image forming apparatus according to claim 1, further comprising a jam sensor configured to detect a recording paper sheet jam in a conveyance path along which the recording paper sheet is to be conveyed, wherein the control section is further configured to:

when the jam sensor detects the recording paper sheet jam, execute control of deactivation of each of the mechanisms; and when thereafter the power-off detecting section detects shutoff of power supply from the power source, execute the control of deactivation of each of the mechanisms again.

6. The image forming apparatus according to claim 5, wherein the control section reactivates each of the mechanisms on condition that not only the rate of change of voltage has reached the predetermined threshold value but also the jam sensor has detected no recording paper sheet jam.

7. The image forming apparatus according to claim 1, wherein the control section is further configured to:

determine whether the rate of change of voltage has reached the predetermined threshold value;

when the rate of change of voltage is short of the predetermined threshold value, allow each of the mechanisms to remain deactivated;

then monitor the voltage value of the power supply line; and when thereafter the voltage value of the power supply line has reached the predetermined voltage value, determine again whether the rate of change of voltage has reached the predetermined threshold value.

* * * * *